United States Patent
Mita et al.

(10) Patent No.: US 6,617,763 B2
(45) Date of Patent: Sep. 9, 2003

(54) PIEZOELECTRIC ACTUATOR SET FOR HEAD ASSEMBLY

(75) Inventors: Tsuyoshi Mita, Kawasaki (JP); Masaharu Hida, Kawasaki (JP); Kazuaki Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/090,959

(22) Filed: Mar. 5, 2002

(65) Prior Publication Data
US 2003/0071541 A1 Apr. 17, 2003

(30) Foreign Application Priority Data
Oct. 17, 2001 (JP) ........................................ 2001-318985

(51) Int. Cl.[7] ................................................. H02N 2/00
(52) U.S. Cl. .............. 310/328; 310/323.01; 310/323.17
(58) Field of Search ..................... 310/323.01, 323.17, 310/328

(56) References Cited

U.S. PATENT DOCUMENTS

| | | | | |
|---|---|---|---|---|
| 5,745,319 | A | * 4/1998 | Takekado et al. | 360/78.05 |
| 6,246,552 | B1 | * 6/2001 | Soeno et al. | 360/294.4 |
| 6,297,936 | B1 | * 10/2001 | Kant et al. | 360/294.4 |
| 2001/0033452 | A1 | * 10/2001 | Koganezawa et al. | 360/77.02 |
| 2002/0027741 | A1 | * 3/2002 | Koganezawa | 360/78.12 |
| 2002/0043894 | A1 | * 4/2002 | Koganezawa et al. | 310/328 |

FOREIGN PATENT DOCUMENTS

JP  11-273041  10/1999  .......... G11B/5/596

* cited by examiner

Primary Examiner—Thomas M. Dougherty
(74) Attorney, Agent, or Firm—Greer, Burns & Crain, Ltd.

(57) ABSTRACT

A piezoelectric actuator set includes a pair of elongated piezoelectric actuators. The elongated piezoelectric actuators establish the standard attitude of a head slider when no electric signal is supplied to the piezoelectric actuator set. When the electric signal is applied to the piezoelectric actuator set, the tip ends are pulled back toward the base ends in the elongated piezoelectric actuators. The piezoelectric actuator set generates a couple for driving the head slider for rotation around the rotational axis only in a predetermined direction from the standard attitude. The moment of inertia can be reduced in the head slider during rotation as compared with the case where the head slider is moved based on a swinging movement. The natural frequency can be raised in the vibration system comprising the head slider and the piezoelectric actuator set. The frequency of the electric signal or servo signal can be set over a wider frequency range.

18 Claims, 7 Drawing Sheets

PIEZOELECTRIC ACTUATOR SET FOR HEAD ASSEMBLY

BACKGROUND OF THE INVENTION

1. Field of the Invention

The present invention relates to a recording medium drive managing recordation or storage of information in a recording medium. In particular, the invention relates to a recording medium drive including a swinging arm, a head suspension extending forward from the front end of the swinging arm, a head slider, and a microactuator capable of changing the attitude of the head slider relative to the head suspension.

2. Description of the Prior Art

As disclosed in Japanese Patent Application Publication 11-273041, for example, a well-known head assembly sometimes includes piezoelectric actuators interposed between a head slider and a head suspension. A first common attachment piece is fixed to the head suspension in the head assembly. A pair of parallel piezoelectric actuators extend from the first common attachment piece toward the head slider. The tip ends of the respective piezoelectric actuators are coupled to a second common attachment piece fixed to the head slider. The head slider is allowed to swing around the first common attachment piece in response to expansion and shrinkage of the piezoelectric actuators. The swinging movement of the head slider thus realizes a fine or smaller displacement of the head slider in the radial direction of a magnetic or hard disk. The fine displacement of the head slider enables a read/write head on the head slider to follow recording tracks on the magnetic disk at a higher accuracy.

An electric or servo signal is supplied to the piezoelectric actuators for servo controlling the swinging movement of the head slider. If the frequency of the servo signal gets higher, the head slider can be positioned on the recording tracks at a still higher accuracy. An improved accuracy of positioning the read/write head leads to an increased density of recordation over the magnetic disk.

The head slider and the piezoelectric actuator establish a vibration system. Accordingly, if the frequency of the servo signal coincides with the natural frequency of the vibration system, the head slider should suffer from an abnormal displacement, namely, resonance. In this case, the position of the head slider cannot be controlled. If the natural frequency of the vibration system is raised, the frequency range of the servo signal can be expanded.

SUMMARY OF THE INVENTION

It is accordingly an object of the present invention to provide a head assembly contributing to expansion of the frequency range of an electric signal supplied to a piezoelectric actuator.

According to the present invention, there is provided a head assembly comprising: a support member; a head slider; and a piezoelectric actuator set disposed between the support member and the head slider for establishing a standard attitude of the head slider when supply of an electric signal is cut off, wherein said piezoelectric actuator set generates a couple changing an attitude of the head slider around a rotational axis only in a predetermined direction.

The head assembly of this type utilizes the rotation of the head slider so as to accomplish a fine or smaller movement of a head or transducer element. The moment of inertia can be reduced in the head slider during rotation as compared with the case where the head slider is moved based on a swinging movement. Only a smaller moment acts on individual piezoelectric actuators of the piezoelectric actuator set, so that the natural frequency can be raised in the vibration system comprising the head slider and the piezoelectric actuator set. The frequency of the electric signal or servo signal can be set over a wider frequency range.

Moreover, the head assembly simply changes the attitude of the head slider around the rotational axis only in the predetermined direction from the standard attitude. As compared with the case where the attitude of the head slider is changed in at least two directions from the standard attitude, it is possible to simplify the structure of the piezoelectric actuators of the piezoelectric actuator set. Since the piezoelectric actuator set may include few piezoelectric actuators, it is possible to reduce the number of electric terminals, such as golden balls, connected to the piezoelectric actuator set. The electric signal can reliably be supplied to the piezoelectric actuator set with a simplified structure.

For example, the piezoelectric actuator set may include: a first elongated piezoelectric actuator extending in a first direction, a base end of the first elongated piezoelectric actuator being attached to the support member, a tip end of the first elongated piezoelectric actuator being attached to the head slider; and a second elongated piezoelectric actuator extending in a second direction antiparallel to the first direction, a base end of the second elongated piezoelectric actuator being attached to the support member, a tip end of the second elongated piezoelectric actuator being attached to the head slider. In particular, the first elongated piezoelectric actuator is allowed to shrink in a first direction upon supply of the electric signal, while the second elongated piezoelectric actuator is allowed to shrink in a second direction, antiparallel to the first direction, upon supply of the electric signal. The head assembly of this type solely utilizes a pair of the elongated piezoelectric actuators so as to realize the rotation of the head slider. The structure of the head assembly can be simplified. The first and second elongated piezoelectric actuators may be located symmetric to each other around the rotational axis so as to realize the generation of a couple.

The head assembly may further comprise: first outside electrodes connected to the base ends of the first and second elongated piezoelectric actuators, respectively; and second outside electrodes extending from the tip ends toward the base ends along surfaces of the first and second elongated piezoelectric actuators, respectively. The head assembly of this type allows the first and second outside electrodes to be located only near the base ends of the respective elongated piezoelectric actuators. Terminals such as golden balls can thus easily be connected or bonded to the first and second elongated piezoelectric actuators. The electric signal can be supplied to the first and second elongated piezoelectric actuators with a simple structure.

Each of the first and second elongated piezoelectric actuators may comprise: first inside electrode layers connected to the first outside electrode at outer ends of the first inside electrode layers near the base end of the elongated piezoelectric actuator, said first inside electrode layers extending from the outer ends toward the tip end of the elongated piezoelectric actuator; second inside electrode layers each disposed between adjacent ones of the first inside electrode layers and connected to the second outside electrode at outer ends of the second inside electrode layers near the tip end of the elongated piezoelectric actuator, said second inside electrode layers extending from the outer ends toward the base end of the elongated piezoelectric actuator; and active piezoelectric transducer layers interposed between the first and second inside electrode layers. When the electric signal is supplied to the active piezoelectric transducer layers, the active piezoelectric transducer layers shrink in the d31 direction, perpendicular to the direction of the electric signal, based on a so-called lateral effect. Specifically, the active piezoelectric transducer layers shrink along the first and second inside electrode layers. The shrinkage of the piezoelectric actuators is thus realized. The amount of the shrinkage depends upon the intensity of the applied voltage. The active piezoelectric transducer layer may be made from a piezoelectric material such as PNN-PT-PZ, for example.

Each of the first and second elongated piezoelectric actuators may further comprise an inactive piezoelectric transducer layer superposed over an outer surface of at least one of the first and second inside electrode layers between the trailing and tip ends of the elongated piezoelectric actuator. The active piezoelectric transducer layers solely shrink in the first and second elongated piezoelectric actuators upon supply of the electric signal. The inactive piezoelectric transducer layer serves to prevent the active piezoelectric transducer layers from shrinkage. As a result, the elongated piezoelectric actuators of this type are allowed to bend upon supply of the electric signal. The bending and the shrinkage cooperate to generate the aforementioned couple. The inactive piezoelectric transducer layer may be made from the material identical to that of the active piezoelectric transducer layer.

The head assembly of the type described above may be incorporated in a magnetic disk drive such as hard disk drive (HDD), and the other types of recording disk drives.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
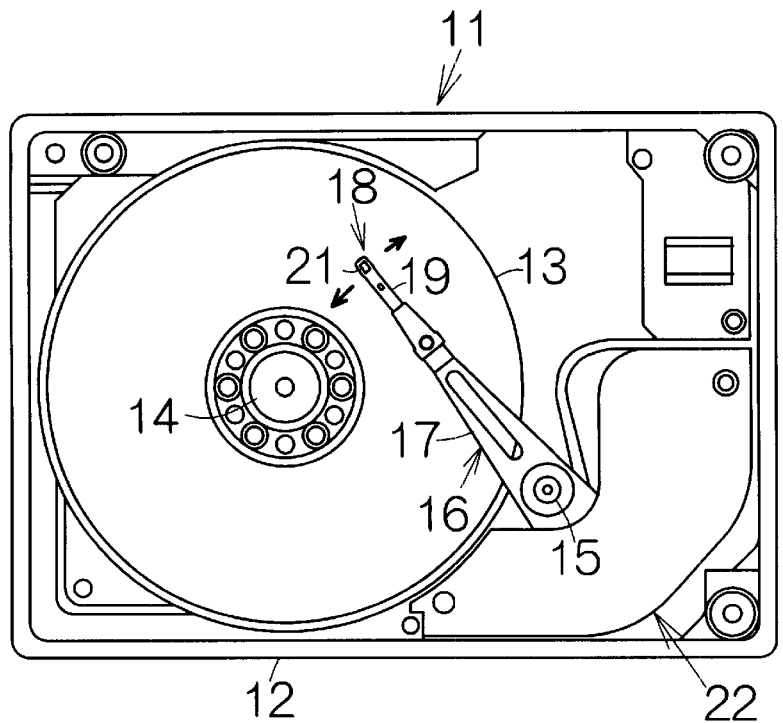
FIG. 1 is a plan view schematically illustrating the structure of a hard disk drive (HDD) as an example of a recording medium drive.

FIG. 1 schematically illustrates the inner structure of a hard disk drive (HDD) 11 as an example of a recording medium drive or storage device. The HDD 11 includes a box-shaped primary enclosure 12 defining an inner space of a flat parallelepiped, for example. At least one magnetic recording disk 13 is accommodated in the inner space within the primary enclosure 12. The magnetic recording disk 13 is mounted on a driving shaft of a spindle motor 14. The spindle motor 14 is allowed to drive the magnetic recording disk 13 for rotation at a higher revolution speed such as 7,200 rpm or 10,000 rpm, for example. A cover, not shown, is coupled to the primary enclosure 12 so as to define the closed inner space between the primary enclosure 12 and itself.

A carriage 16 is also accommodated in the inner space of the primary enclosure 12 for swinging movement about a vertical support shaft 15. The carriage 16 includes a rigid swinging arm 17 extending in the horizontal direction from the vertical support shaft 15, and a head suspension assembly 18 attached to the front or tip end of the swinging arm 17. The head suspension assembly 18 includes an elastic head suspension 19 extending forward from the front end of the swinging arm 17. As conventionally known, a flying head slider 21 is supported on the head suspension 19 near the front end thereof. The head suspension 19 functions as a support member according to the present invention.

The head suspension 19 serves to urge the flying head slider 21 toward the surface of the magnetic recording disk 13. When the magnetic recording disk 13 rotates, the flying head slider 21 is allowed to receive airflow generated along the rotating magnetic recording disk 13. The airflow serves to generate a lift on the flying head slider 21. The flying head slider 21 is thus allowed to keep flying above the surface of the magnetic recording disk 13 during rotation of the magnetic recording disk 13 at a higher stability established by the balance between the lift and the urging force of the head suspension 19.

When the carriage 16 is driven to swing about the support shaft 15 during flight of the flying head slider 21, the flying head slider 21 is allowed to cross the recording tracks defined on the magnetic recording disk 13 in the radial direction of the magnetic recording disk 13. This radial movement serves to position the flying head slider 21 right above a target recording track on the magnetic recording disk 13. In this case, an electromagnetic actuator 22 such as a voice coil motor (VCM) can be employed to realize the swinging movement of the carriage 16, for example. As conventionally known, in the case where two or more magnetic recording disks 13 are incorporated within the inner space of the primary enclosure 12, a pair of the elastic head suspension assemblies 18 are mounted on a single common swinging arm 17 between the adjacent magnetic recording disks 13.

Figure 2:
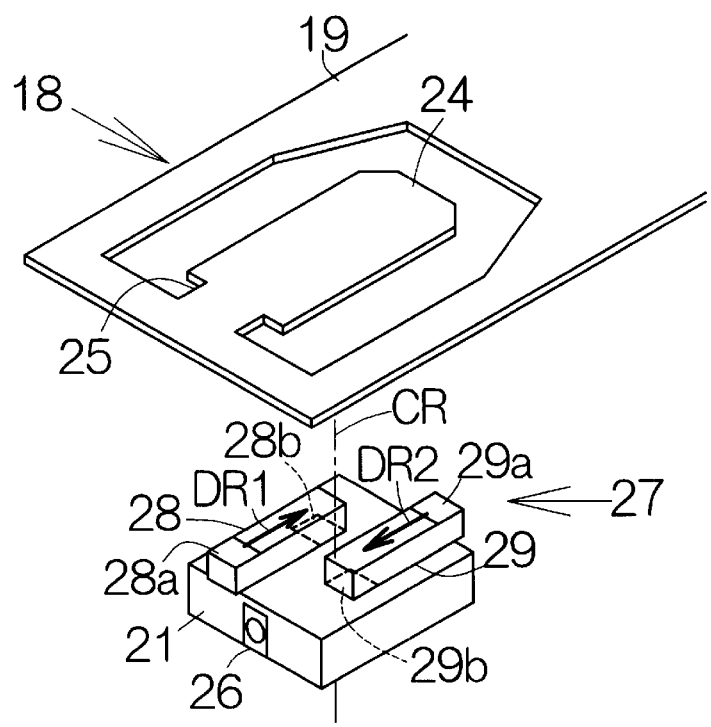
FIG. 2 is an enlarged partial perspective view illustrating the structure of a head suspension assembly in detail.

As shown in FIG. 2, a support plate 24 is punched out at the front end of the head suspension 19 in the head suspension assembly 18. The support plate 24 is allowed to change its attitude based on the action of a so-called gimbal spring 25. The flying head slider 21 is received on the surface of the support plate 24. A magnetic transducer element 26 is mounted on the flying head slider 21. The magnetic transducer element 26 may include a write element such as a thin film magnetic head utilized to write a magnetic information into the magnetic recording disk 13, and a read element such as a giant magnetoresistive (GMR) element and a tunnel-junction magnetoresistive (TMR) element utilized to read a magnetic information out of the magnetic recording disk 13, for example.

Piezoelectric actuator set 27 is disposed between the flying head slider 21 and the support plate 24. The piezoelectric actuator set 27 includes a first elongated piezoelectric actuator 28. The first elongated piezoelectric actuator 28 is fixed to the support plate 24 at the base end 28a. The first elongated piezoelectric actuator 28 is designed to extend from the base end 28a in a first direction DR1. The tip end 28b of the first elongated piezoelectric actuator 28 in the first direction DR1 is fixed to the flying head slider 21. Likewise, the piezoelectric actuator set 27 includes a second elongated piezoelectric actuator 29. The second elongated piezoelectric actuator 29 is fixed to the support plate 24 at the base end 29a. The second elongated piezoelectric actuator 29 is designed to extend from the base end 29a in a second direction DR2. The tip end 29b of the second elongated piezoelectric actuator 29 in the second direction DR2 is fixed to the flying head slider 21. The second direction DR2 is set antiparallel to the first direction DR1. An adhesive including an epoxy resin may be employed to fix the first and second elongated piezoelectric actuators 28, 29 to the support plate 24 as well as the flying head slider 21, for example.

Figure 3:
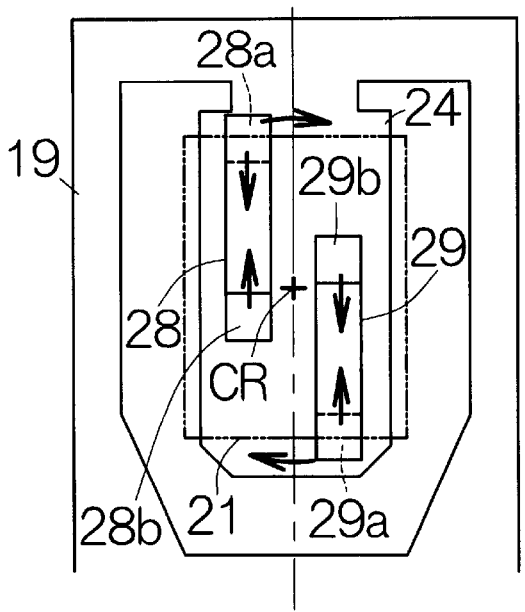
FIG. 3 is an enlarged plan view of a support plate for illustrating the location of the first and second elongated piezoelectric actuators.

As is apparent from FIG. 3, the first and second elongated piezoelectric actuators 28, 29 are located symmetric around a predetermined rotational axis CR set perpendicular to the upper surface of the flying head slider 21. Accordingly, when the first and second elongated piezoelectric actuators 28, 29 get shrunk, a couple is generated around the rotational axis CR. The flying head slider 21 thus receives the driving force for rotation around the rotational axis CR based on the generated couple. The attitude of the flying head slider 21 can be changed around the rotational axis CR based on the application of the driving force.

Figure 4:
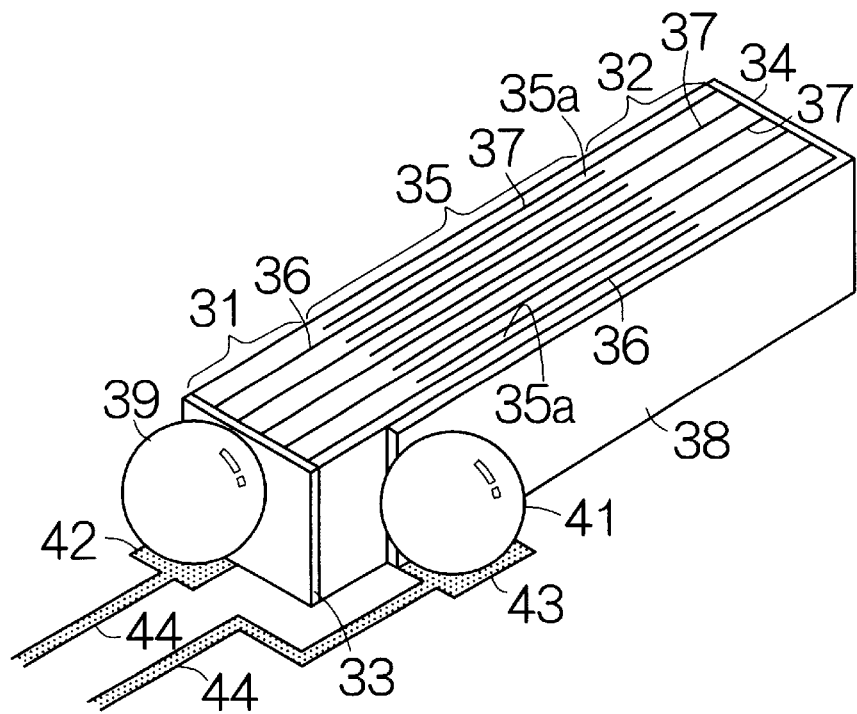
FIG. 4 is an enlarged perspective view schematically illustrating the structure of an elongated piezoelectric actuator according to a first embodiment of the present invention.

As shown in FIG. 4, the first elongated piezoelectric actuator 28 according to a first embodiment of the present invention includes a first piezoelectric ceramic block 31 forming the base end 28a of the first elongated piezoelectric actuator 28, and a second piezoelectric ceramic block 32 likewise forming the tip end 28a of the first elongated piezoelectric actuator 28. A first outside electrode layer 33 is coupled to the end surface of the base end 28a of the first elongated piezoelectric actuator 28, namely, an exposed surface of the first piezoelectric ceramic block 31. Likewise, a second outside electrode layer 34 is coupled to the end surface of the tip end 28b of the first elongated piezoelectric actuator 28, namely, an exposed surface of the second piezoelectric ceramic block 32. The first and second outside electrode layers 33, 34 may be made of an electrically conductive metallic material such as Pt, for example.

A stack 35 of piezoelectric ceramic layers 35a is interposed between the first and second piezoelectric ceramic blocks 31, 32. First and second inside electrode layers 36, 37 are alternately sandwiched between the adjacent ones of the piezoelectric ceramic layers 35a in the stack 35. The first inside electrode layers 36 are designed to penetrate through the first piezoelectric ceramic block 31 so as to reach the outer surface of the first piezoelectric ceramic block 31. In this manner, the outer ends of the first inside electrode layers 36 are connected to the first outside electrode layer 33. The first inside electrode layers 36 are kept outside the second piezoelectric ceramic block 32. Likewise, the second inside electrode layers 37 are designed to penetrate through the second piezoelectric ceramic block 32 so as to reach the outer surface of the second piezoelectric ceramic block 32. The outer ends of the second inside electrode layers 37 are thus connected to the second outside electrode layer 34. The second inside electrode layers 37 are kept outside the first piezoelectric ceramic block 31. The piezoelectric ceramic layers 35a between the first and second inside electrode layers 36, 37 correspond to active piezoelectric transducer layers according to the present invention. The first and second piezoelectric ceramic blocks 31, 32 as well as the piezoelectric ceramic layers 35a may be made of a piezoelectric material such as PNN-PT-PZ, for example. The first and second inside electrode layers 36, 37 may be made of an electrically conductive material such as Pt, for example.

A surface electrode layer 38 is coupled to the outer surface of the stack 35 in the first elongated piezoelectric actuator 28. The surface electrode layer 38 is designed to extend from the outer surface of the second piezoelectric ceramic block 32 near the tip end 28b toward the base end 28a in the first elongated piezoelectric actuator 28. The surface electrode layer 38 may serve to hold the outermost piezoelectric ceramic layer 35a against the first inside electrode layer 36. The surface electrode layer 38 is connected to the second outside electrode layer 34 at one end. The other end of the surface electrode layer 38 is terminated at a position spaced from the first outside electrode layer 33. Specifically, an electric connection is prohibited between the surface electrode layer 38 and the first outside electrode layer 33. The surface electrode layer 38 and the second outside electrode layer 34 thus correspond to a second outside electrode according to the present invention. The surface electrode layer 38 may be made of an electrically conductive material such as Pt, for example.

The first outside electrode layer 33 and the surface electrode layer 38 are designed to stand on the surface of the support plate 24 at the periphery of the first piezoelectric ceramic block 31. An electrically conductive terminal 39 such as a golden ball, for example, is connected to the exposed surface of the first outside electrode layer 33. A solder paste may be employed to attach the electrically conductive terminal 39 to the first outside electrode layer 33. Likewise, an electrically conductive terminal 41, such as a golden ball, is connected to the surface electrode layer 38 at the periphery of the first piezoelectric ceramic block 31.

On the other hand, electrically conductive terminal pads 42, 43 are located on the surface of the support plate 24. The electrically conductive terminals 39, 41 are received on the electrically conductive terminal pads 42, 43, respectively. The electrically conductive terminal pads 42, 43 are coupled to an electrically conductive wiring pattern 44 extending over the surface of the head suspension 19. The electrically conductive wiring pattern 44 may be connected to a controller chip, not shown, incorporated within the HDD 11.

Assume that an electric signal of a predetermined voltage is supplied to the first piezoelectric actuator 28 through the electrically conductive terminals 39, 41. The individual piezoelectric ceramic layer 35a is allowed to receive the field intensity, of approximately 1 kV/mm, for example, between the first and second inside electrode layers 36, 37. The applied voltage serves to generate polarization, corresponding to the direction of the applied voltage, in the individual piezoelectric ceramic layer 35a. When an electric signal is further supplied to the individual piezoelectric ceramic layer 35a subsequent to the polarization, the piezoelectric ceramic layer 35a shrinks in the d31 direction, which is a direction perpendicular to the direction of the polarization, based on a so-called lateral effect. The amount of shrinkage depends upon the intensity of the applied voltage. In this manner, the shrinkage of the first elongated piezoelectric actuator 28 can be realized. It should be noted that the second elongated piezoelectric actuator 29 may have the structure identical to that of the first elongated piezoelectric actuator 28.

When no electric signal is supplied to the piezoelectric actuator set 27, the piezoelectric actuator set 27 serves to establish the standard attitude of the flying head slider 21 on the support plate 24, as shown in FIG. 3, for example. When the voltage is applied to the first and second elongated piezoelectric actuators 28, 29, the first and second elongated piezoelectric actuators 28, 29 both get shrunk in the aforementioned manner. The tip ends 28b, 29b are pulled back toward the base ends 28a, 29a in the first and second elongated piezoelectric actuators 28, 29. The action of the first and second elongated piezoelectric actuators 28, 29 generates a couple around the rotational axis CR. The generated couple causes the rotation of the flying head slider 21 around the rotational axis CR only in a predetermined direction from the standard attitude. In this manner, the attitude of the flying head slider 21 can be changed on the support plate 24. When the supply of the electric signal is terminated, the first and second elongated piezoelectric actuators 28, 29 are allowed to elongate until they return to the original forms. The flying head slider 21 thus reverts to the standard attitude around the rotational axis CR.

Now, assume that the magnetic transducer element 26 on the flying head slider 21 is to be positioned on a specific recording track on the magnetic recording disk 13. In this case, the controller chip of the HDD 11 is set to supply the electric signal in a range between 0V and 30V, for example, to the first and second elongated piezoelectric actuators 28, 29. When the maximum voltage of 30V is applied to the first and second elongated piezoelectric actuators 28, 29, the first and second elongated piezoelectric actuators 28, 29 shrink by the maximum amount. Here, the magnetic transducer element 26 is allowed to move or shift on the support plate 24 in the lateral direction perpendicular to the recording track by the maximum linear amount or stroke of approximately 1.0 μm.

Figure 5:
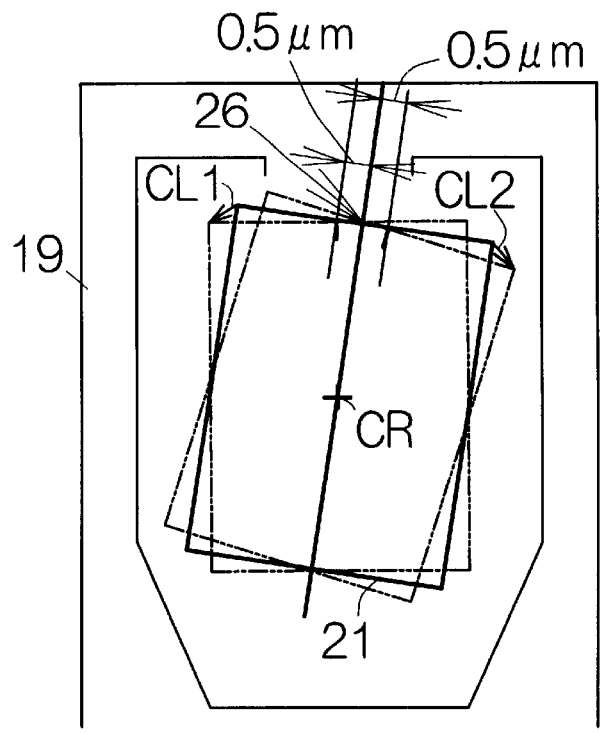
FIG. 5 is an enlarged plan view of the support plate for schematically illustrating the movement of the flying head slider.

Prior to commencement of positioning the magnetic transducer element 26, the electric signal of 15V is supplied to the piezoelectric actuator set 27. Accordingly, the magnetic transducer element 26 is moved on the support plate 24 by a half of the maximum stroke, namely, the stroke of 0.5 μm, as shown in FIG. 5, for example. Thereafter, the magnetic transducer element 26 is roughly positioned above the target recording track based on the swinging movement of the carriage 16 or swinging arm 17.

When the magnetic transducer element 26 starts to follow the target recording track, the controller chip supplies the electric signal to the piezoelectric actuator set 27 based on the servo control. When the voltage of the electric signal is reduced below 15V, the first and second elongated piezoelectric actuators 28, 29 get elongated. The flying head slider 21 is thus driven to rotate around the rotational axis CR in the counterclockwise direction CL1. This rotation of the flying head slider 21 allows the magnetic transducer element 26 to move in the radial direction of the magnetic recording disk 13. When the voltage of the electric signal is raised over 15V, the first and second elongated piezoelectric actuators 28, 29 get shrunk. The flying head slider 21 is thus driven to rotate around the rotational axis CR in the clockwise direction CL2. This rotation of the flying head slider 21 allows the magnetic transducer element 26 to move in the opposite direction along the radial direction of the magnetic recording disk 13. In this manner, the magnetic transducer element 26 is forced to follow the target recording track at a higher accuracy.

The head suspension assembly 18 utilizes the rotation of the flying head slider 21 so as to accomplish a fine or smaller movement of the magnetic transducer element 26. The moment of inertia can be reduced in the flying head slider 21 during rotation. Only a smaller moment acts on the individual elongated piezoelectric actuator 28, 29, so that the natural frequency can be raised in the vibration system comprising the flying head slider 21 and the piezoelectric actuator set 27. The frequency of the electric signal or servo signal can be set over a wider frequency range. To the contrary, in the case where the flying head slider 21 is moved based on a swinging movement, the overall mass of the flying head slider 21 contributes to generation of the moment of inertia. In addition, the distance is increased between the center of mass and the center of trajectory. A larger moment of inertia is forced to act on the flying head slider 21. The servo signal tends to generate the resonance at a relatively lower frequency range.

Moreover, the head suspension assembly 18 solely utilizes a pair of the elongated piezoelectric actuators 28, 29 so as to realize the rotation of the flying head slider 21. The structure of the head suspension assembly 18 can be simplified. Additionally, the electrically conductive terminals 39, 41 can easily be connected to the first and second elongated piezoelectric actuators 28, 29. The first and second elongated piezoelectric actuators 28, 29 are allowed to receive the electric signal with a simple structure. Here, four elongated piezoelectric actuators can be located around the rotational axis of the flying head slider as disclosed in International Patent Application PCT/JP01/02417. The natural frequency can likewise be raised in the vibration system comprising the flying head slider and the four elongated piezoelectric actuators. However, terminals for electric connection should be increased, so that the structure of the elongated piezoelectric actuators gets complicated.

Figure 6:
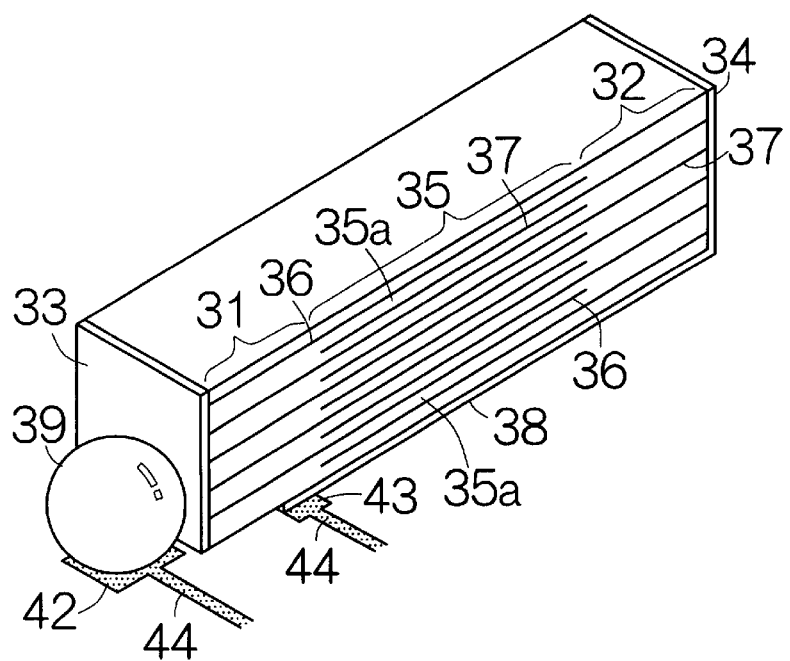
FIG. 6 is an enlarged perspective view schematically illustrating the structure of an elongated piezoelectric actuator according to a modification of the first embodiment.

The surface electrode layers 38 of the first and second elongated piezoelectric actuators 28, 29 may be superposed over the surface of the support plate 24 in the aforementioned head suspension assembly 18, as shown in FIG. 6. In this case, the surface electrode layer 38 is superposed on the electrically conductive terminal pad 43 on the support plate 24 at the periphery of the first piezoelectric ceramic block 31. An electrically conductive adhesive may be employed to fix the surface electrode layer 38 on the electrically conductive terminal pad 43, for example. The electrically conductive adhesive realizes the physical connection between the support plate 24 and the first and second elongated piezoelectric actuators 28, 29 as well as the electric connection between the surface electrode layer 38 and the electrically conductive terminal pad 43. The first and second elongated piezoelectric actuators 28, 29 of this type serve to reliably avoid the electric connection or contact between the flying head slider 21 and the first and second inside electrode layers 36, 37 as well as the surface electrode layers 38.

Figure 7:
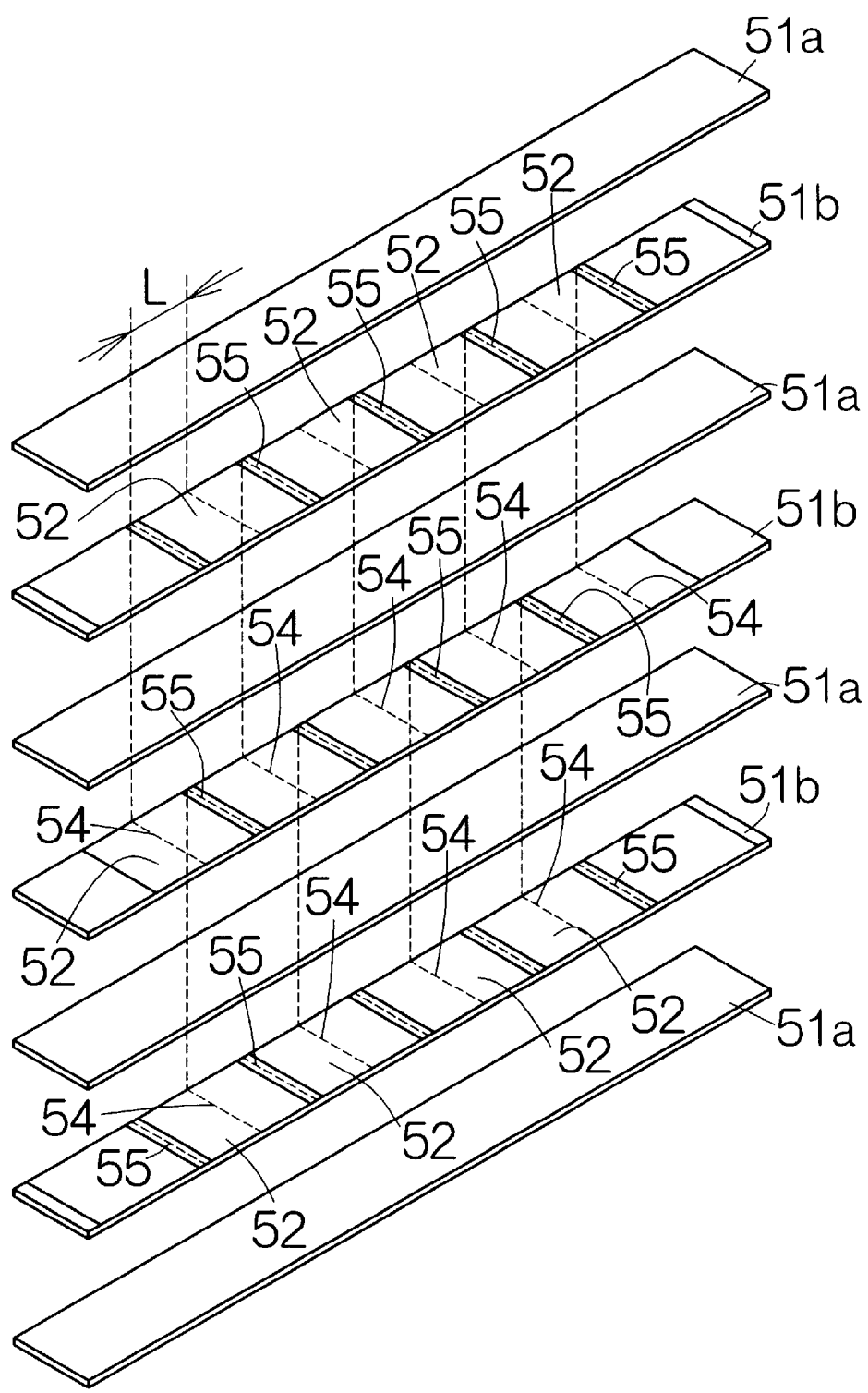
FIG. 7 is a perspective view schematically illustrating first and second green sheet strips employed to make the elongated piezoelectric actuators.

Next, a brief description will be made on a method of making the elongated piezoelectric actuators 28, 29. As shown in FIG. 7, first and second green sheet strips 51a, 51b are first prepared. The first and second green sheet strips 51a, 51b have the identical shape. The thickness of the green sheet strips 51a, 51b may be set at approximately 20 μm, for example. The green sheet strips 51a, 51b may be made from the powder of a piezoelectric material such as PNN-PT-PZ, for example. Thin films 52 of an electrically conductive material, such as Pt, are added to the surface of the individual second green sheet strip 51b. Screen printing may be employed to form the thin films 52.

Exposed areas are kept on the second green sheet strip 51b between the adjacent ones of the thin films 52. The exposed area is allowed to completely cross the second green sheet strip 51b in the lateral direction perpendicular to the longitudinal direction of the second green sheet strip 51b. The centerlines 54 can be defined on the individual thin films 52 in the lateral direction. The centerlines 55 can also be defined on the individual exposed areas. The space L between the centerlines 54, 55 is set equal to the length of the first and second elongated piezoelectric actuators 28, 29.

Figure 8:
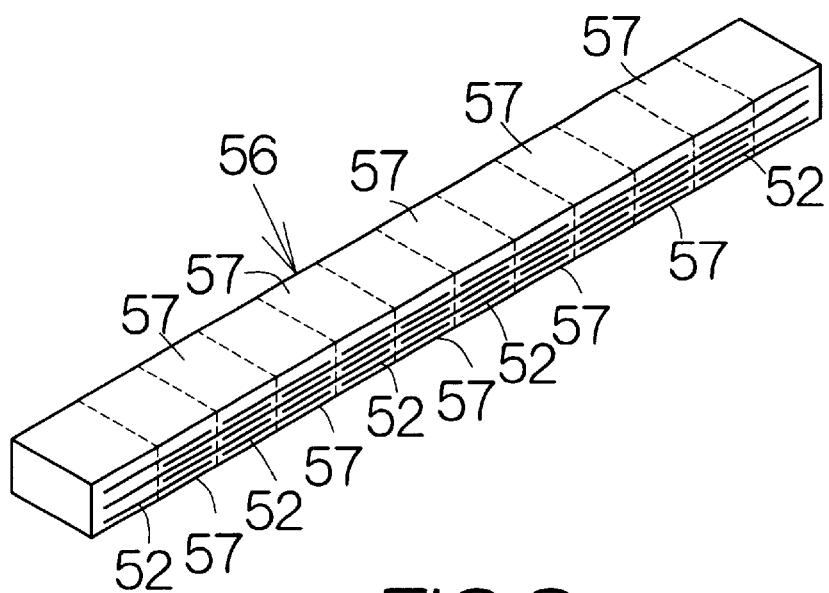
FIG. 8 is a perspective view schematically illustrating a stack of the green sheet strips employed to make the elongated piezoelectric actuators.

The second green sheet strips 51b are then sequentially superposed one another. The number of the second green sheet strip 51b may be set dependent upon the amount of the intended shrinkage in the first and second elongated piezoelectric actuators 28, 29. The centerlines 55 of the exposed areas on the upper second green sheet strips 51b are aligned with the centerlines 53 of the thin films 52 on the lower second green sheet strips 51b. One or more first green sheet strips 51a may be interposed between the upper and lower second green sheet strips 51b. The number of the interposed first green sheet strip 51a may be set dependent upon the intended thickness of the active piezoelectric transducer layer for the first and second elongated piezoelectric actuators 28, 29. The first green sheet strips 51a may also be superposed over the lower surface of the lowest second green sheet strip 51b and/or the upper surface of the uppermost second green sheet strips 51b. A stack 56 of the green sheet strips 51a, 51b can finally be obtained as shown in FIG. 8.

Figure 9:
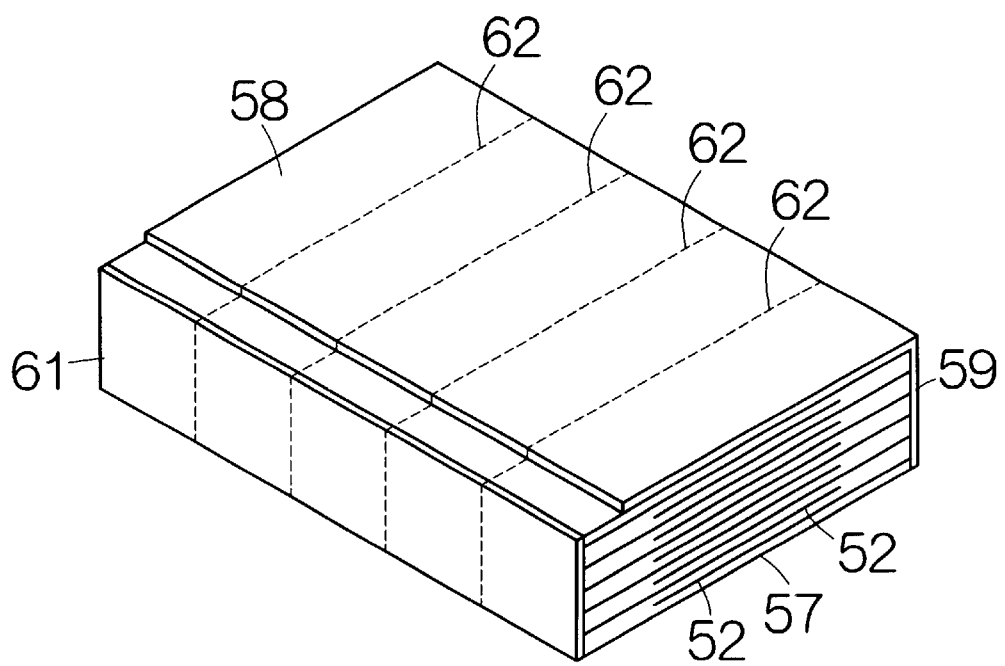
FIG. 9 is an enlarged perspective view illustrating electrode thin films formed on a stack segment.

The stack 56 is then baked at the temperature of 1,050 degrees Celsius, for example, in the normal atmosphere. The superposed first and second green sheet strips 51a, 51b get integrated based on the baking. Thereafter, the stack 56 is cut and divided along the aforementioned centerlines 54, 55. Stack segments 57 are obtained in this manner. Each stack segment 57 includes a row of the elongated piezoelectric actuators. As shown in FIG. 9, an electrode thin film 58 is formed to extend on the stack segment 57 over the exposed surface of the segment of the uppermost first green sheet strip 51a. the electrode thin film 58 may be made of an electrically conductive material such as Pt, for example. Likewise, electrode thin films 59, 61 are formed to spread over the cut or sectional surfaces of the stack segment 57. The electrode thin film 59 on one of the cut surfaces is connected to the electrode thin film 58. An exposed area is maintained on the stack segment 57 between the electrode thin films 58, 61.

The first and second elongated piezoelectric actuators 28, 29 are then cut out of the stack segment 57. The cutting is effected along planes 62 intersecting the aforementioned cut surfaces by right angles. The first and second elongated piezoelectric actuators 28, 29 are thus obtained. The first and second elongated piezoelectric actuators 28, 29 are finally adhered to the support plate 24 as well as the flying head slider 21 as described above.

The present inventors have measured the displacement or movement amount of the magnetic transducer element 26 as well as the frequency of resonance during the servo control for positioning the magnetic transducer element 26. A laser Doppler velocimeter and a servo analyzer were employed in the measurement. Nine active piezoelectric transducer layers, namely, nine piezoelectric ceramic layers 35a were established in the individual first and second elongated piezoelectric actuators 28, 29. While the tip ends 28b, 29b of the first and second elongated piezoelectric actuators 28, 29 were adhered to the flying head slider 21, as described above, the base ends 28a, 29a of the first and second elongated piezoelectric actuators 28, 29 were adhered to a ceramic substrate. The electric signal comprising the sine wave of 30V peak-to-peak was supplied to the first and second elongated piezoelectric actuators 28, 29. The displacement amount exceeding 1.0 μm was demonstrated. The frequency of resonance has exceeded 20 kHz.

Figure 10:
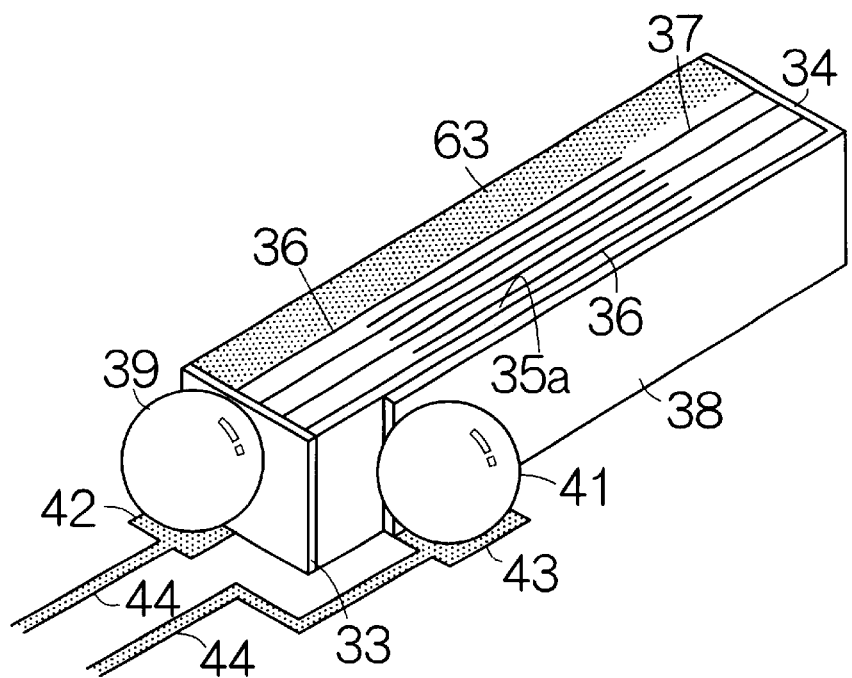
FIG. 10 is an enlarged perspective view of the support plate for schematically illustrating the structure of an elongated piezoelectric actuator according to a second embodiment of the present invention.

FIG. 10 illustrates the first and second elongated piezoelectric actuators 28, 29 according to a second embodiment of the present invention. Inactive piezoelectric transducer layers 63 are superposed over the exposed surface of at least one of the first and second inside electrode layers 36, 37 between the base ends 28a, 29a and the tip ends 28b, 29b in the first and second elongated piezoelectric actuators 28, 29. The inactive piezoelectric transducer layer 63 may be made of a piezoelectric material such as PNN-PT-PZ, for example. Since no path for electric signals is established in the inactive piezoelectric transducer layer 63 based on the inside electrode layers 36, 37, shrinkage and elongation are prevented in the piezoelectric transducer layer 63. A plurality of the first green sheet strips 51a may be superposed on the lower surface of the lowest second green sheet strip 51b or the upper surface of the uppermost second green sheet strip 51b so as to add the inactive piezoelectric transducer layer 63 in the aforementioned method of making the first and second elongated piezoelectric actuators 28, 29. Note that like reference numerals are attached to the structure or component equivalent to those of the aforementioned head suspension assembly 18 and the first and second elongated piezoelectric actuators 28, 29.

Figure 11:
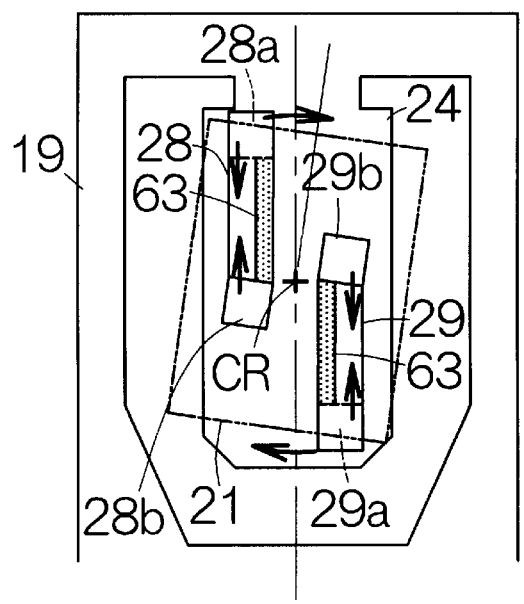
FIG. 11 is an enlarged plan view of the support plate for schematically illustrating the movement of the elongated piezoelectric actuators according to the second embodiment.

When the electric signal is supplied to the elongated piezoelectric actuators 28, 29, the stack 35 of the piezoelectric ceramic layers 35a, namely, the active piezoelectric transducer layers solely get shrunk in the first and second elongated piezoelectric actuators 28, 29, as is apparent from FIG. 11. The shrinkage of the active piezoelectric transducer layers serves to pull back the tip ends 28b, 29b toward the base ends 28a, 29a. On the other hand, no shrinkage is realized in the inactive piezoelectric transducer layers 63. The inactive piezoelectric transducer layer 63 serves to prevent the shrinkage of the active piezoelectric transducer layer, namely, of the stack 35 of the piezoelectric ceramic layers 35a. The first and second elongated piezoelectric actuators 28, 29 are allowed to bend when the electric signal is supplied to the first and second elongated piezoelectric actuators 28, 29. The bending of the first and second elongated piezoelectric actuators 28, 29 drives the flying head slider 21 to rotate around the rotational axis CR in the same manner as described above.

The present inventors have also measured the displacement or movement amount of the magnetic transducer element 26 as well as the frequency of resonance during the servo control for positioning the magnetic transducer element 26 based on this second embodiment, in the same manner as described above. Five active piezoelectric transducer layers, namely, five piezoelectric ceramic layers 35a were established in the individual first and second elongated piezoelectric actuators 28, 29. The displacement amount exceeding 1.0 µm was demonstrated. The frequency of resonance has exceeded 20 kHz. The displacement amount identical to that of the aforementioned first embodiment could be maintained irrespective of reduction in the number of the active piezoelectric transducer layers. Specifically, a larger change in the attitude of the flying head slider 21 could be realized with few active piezoelectric transducer layers.

Figure 12:
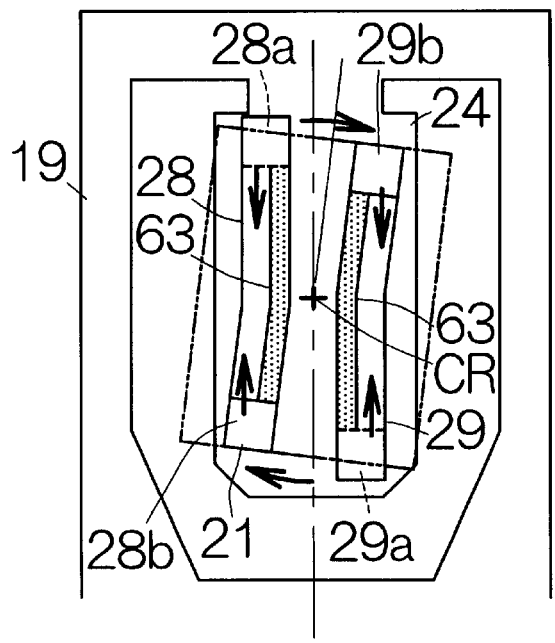
FIG. 12 is an enlarged plan view of the support plate for schematically illustrating the structure of an elongated piezoelectric actuator according to a modification of the third embodiment.

Here, the first and second elongated piezoelectric actuators 28, 29 may longitudinally extend all over the flying head slider 21, as shown in FIG. 12, for example. The extended length of the first and second elongated piezoelectric actuators 28, 29 in this manner has realized the displacement amount exceeding 1.4 µm. The frequency of resonance still has been maintained over a range exceeding 20 kHz.

Figure 13:
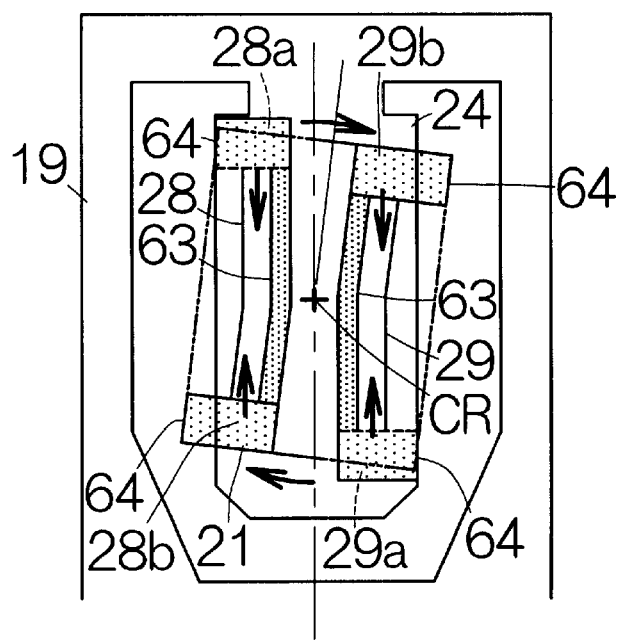
FIG. 13 is an enlarged plan view of the support plate for schematically illustrating the structure of an elongated piezoelectric actuator according to a third embodiment of the present invention.

FIG. 13 illustrates the first and second elongated piezoelectric actuators 28, 29 according to a third embodiment of the present invention. In this third embodiment, additional blocks 64 are attached to the base ends 28a, 29a and the tip ends 28b, 29b of the first and second elongated piezoelectric actuators 28, 29 for reinforcement. The first and second elongated piezoelectric actuators 28, 29 of this type allows the first and second elongated piezoelectric actuators 28, 29 to contact the support plate 24 as well as the flying head slider 21 over larger contact areas. The first and second elongated piezoelectric actuators 28, 29 can be adhered to the support plate 24 as well as the flying head slider 21 over larger areas. Accordingly, the bonding strength can be improved between the first and second elongated piezoelectric actuators 28, 29 and the support plate 24 as well as the flying head slider 21. Still, the displacement amount over 1.0 µm can be maintained. The frequency of resonance can be raised over 20 kHz. The first and second elongated piezoelectric actuators 28, 29 may be punched out of the stack segment 57 by a predetermined shape so as to form the additional blocks 64 in the aforementioned method of making the first and second elongated piezoelectric actuators 28, 29. Note that like reference numerals are attached to the structure or component equivalent to those of the aforementioned head suspension assembly 18 and the first and second elongated piezoelectric actuators 28, 29.

What is claimed is:

1. A head assembly comprising:
    a support member;
    a head slider; and
    a piezoelectric actuator set disposed between the support member and the head slider for establishing a standard attitude of the head slider when supply of an electric signal is cut off, said piezoelectric actuator set including:
        a first elongated piezoelectric actuator shrinking in a first direction upon supply of the electric signal; and
        a second elongated piezoelectric actuator shrinking in a second direction, antiparallel to the first direction, upon supply of the electric signal, wherein
        said piezoelectric actuator set generates a couple changing an attitude of the head slider around a rotational axis only in a predetermined direction.

2. The head assembly according to claim 1, wherein said first and second elongated piezoelectric actuators are located symmetric to each other around the rotational axis.

3. A head assembly comprising:
    a support member;
    a head slider; and
    a piezoelectric actuator set disposed between the support member and the head slider for establishing a standard attitude of the head slider when supply of an electric signal is cut off, said piezoelectric actuator set including:
        a first elongated piezoelectric actuator extending in a first direction, a base end of the first elongated piezoelectric actuator being attached to the support member, a tip end of the first elongated piezoelectric actuator being attached to the head slider; and
        a second elongated piezoelectric actuator extending in a second direction antiparallel to the first direction, a base end of the second elongated piezoelectric actuator being attached to the support member, a tip end of the second elongated piezoelectric actuator being attached to the head slider, wherein said piezoelectric actuator set generates a couple changing an attitude of the head slider around a rotational axis only in a predetermined direction.

4. The head assembly according to claim 3, wherein said first and second elongated piezoelectric actuators are located symmetric to each other around the rotational axis.

5. The head assembly according to claim 4, further comprising:
    first outside electrodes connected to the base ends of the first and second elongated piezoelectric actuators, respectively; and
    second outside electrodes extending from the tip ends toward the base ends along surfaces of the first and second elongated piezoelectric actuators, respectively.

6. The head assembly according to claim 5, wherein each of said first and second elongated piezoelectric actuators comprises:
    first inside electrode layers connected to the first outside electrode at outer ends of the first inside electrode layers near the base end of the elongated piezoelectric actuator, said first inside electrode layers extending from the outer ends toward the tip end of the elongated piezoelectric actuator;
    second inside electrode layers each disposed between adjacent ones of the first inside electrode layers and connected to the second outside electrode at outer ends of the second inside electrode layers near the tip end of the elongated piezoelectric actuator, said second inside electrode layers extending from the outer ends toward the base end of the elongated piezoelectric actuator; and
    active piezoelectric transducer layers interposed between the first and second inside electrode layers.

7. The head assembly according to claim 6, wherein said active piezoelectric transducer layer is made from PNN-PT-PZ.

8. The head assembly according to claim 7, wherein each of the first and second elongated piezoelectric actuators further comprises an inactive piezoelectric transducer layer superposed over an outer surface of at least one of the first and second inside electrode layers between the trailing and tip ends of the elongated piezoelectric actuator.

9. The head assembly according to claim 8, wherein said inactive piezoelectric transducer layer is made from PNN-PT-PZ.

10. A recording medium drive comprising:
    a swinging arm;
    a head suspension extending forward from a front end of the swinging arm;
    a head slider; and
    a piezoelectric actuator set disposed between the head suspension and the head slider for establishing a standard attitude of the head slider when supply of an electric signal is cut off, said piezoelectric actuator set including:
- a first elongated piezoelectric actuator shrinking in a first direction upon supply of the electric signal; and
- a second elongated piezoelectric actuator shrinking in a second direction, antiparallel to the first direction, upon supply of the electric signal,
- wherein said piezoelectric actuator set generates a couple changing an attitude of the head slider around a rotational axis only in a predetermined direction.

11. The recording medium drive according to claim 10, wherein said first and second elongated piezoelectric actuators are located symmetric to each other around the rotational axis.

12. A recording medium drive comprising:
- a head suspension extending forward from a front end of the swinging arm;
- a head slider; and
- a piezoelectric actuator set disposed between the head suspension and the head slider for establishing a standard attitude of the head slider when supply of an electric signal is cut off, said piezoelectric actuator set including:
  - a first elongated piezoelectric actuator extending in a first direction, a base end of the first elongated piezoelectric actuator being attached to the head suspension, a tip end of the first elongated piezoelectric actuator being attached to the head slider; and
  - a second elongated piezoelectric actuator extending in a second direction antiparallel to the first direction, a base end of the second elongated piezoelectric actuator being attached to the head suspension, a tip end of the second elongated piezoelectric actuator being attached to the head slider,
  - wherein said piezoelectric actuator set generates a couple changing an attitude of the head slider around a rotational axis only in a predetermined direction.

13. The recording medium drive according to claim 12, wherein said first and second elongated piezoelectric actuators are located symmetric to each other around the rotational axis.

14. The recording medium drive according to claim 13, further comprising:
- first outside electrodes connected to the base ends of the first and second elongated piezoelectric actuators, respectively; and
- second outside electrodes extending from the tip ends toward the base ends along surfaces of the first and second elongated piezoelectric actuators, respectively.

15. The recording medium drive according to claim 14, wherein each of said first and second elongated piezoelectric actuators comprises:
- first inside electrode layers connected to the first outside electrode at outer ends of the first inside electrode layers near the base end of the elongated piezoelectric actuator, said first inside electrode layers extending from the outer ends toward the tip end of the elongated piezoelectric actuator;
- second inside electrode layers each disposed between adjacent ones of the first inside electrode layers and connected to the second outside electrode at outer ends of the second inside electrode layers near the tip end of the elongated piezoelectric actuator, said second inside electrode layers extending from the outer ends toward the base end of the elongated piezoelectric actuator; and
- active piezoelectric transducer layers interposed between the first and second inside electrode layers.

16. The recording medium drive according to claim 15, wherein said active piezoelectric transducer layer is made from PNN-PT-PZ.

17. The recording medium drive according to claim 16, wherein each of the first and second elongated piezoelectric actuators further comprises an inactive piezoelectric transducer layer superposed over an outer surface of at least one of the first and second inside electrode layers between the trailing and tip ends of the elongated piezoelectric actuator.

18. The recording medium drive according to claim 17, wherein said inactive piezoelectric transducer layer is made from PNN-PT-PZ.

* * * * *

UNITED STATES PATENT AND TRADEMARK OFFICE
CERTIFICATE OF CORRECTION

PATENT NO. : 6,617,763 B2
DATED : September 9, 2003
INVENTOR(S) : Mita et al.

It is certified that error appears in the above-identified patent and that said Letters Patent is hereby corrected as shown below:

Column 11,
Line 55, a new paragraph should begin with the word "wherein".

Column 13,
Line 16, after "comprising:" add the phrase -- a swinging arm; --.

Signed and Sealed this

Twenty-seventh Day of September, 2005

JON W. DUDAS
*Director of the United States Patent and Trademark Office*